(12) United States Patent
Clancy et al.

(10) Patent No.: US 6,499,719 B1
(45) Date of Patent: Dec. 31, 2002

(54) FLUID COUPLING SYSTEM

(75) Inventors: Gary Clancy, Santa Barbara, CA (US); Robert Haake, Goleta, CA (US)

(73) Assignee: Container Technology, Inc., Santa Barbara, CA (US)

( * ) Notice: Subject to any disclaimer, the term of this patent is extended or adjusted under 35 U.S.C. 154(b) by 64 days.

(21) Appl. No.: 09/611,933

(22) Filed: Jul. 7, 2000

Related U.S. Application Data

(60) Provisional application No. 60/143,127, filed on Jul. 9, 1999.

(51) Int. Cl.$^7$ ................................................ F16L 37/28
(52) U.S. Cl. ...................... 251/149.6; 251/336; 285/914
(58) Field of Search ........................... 251/149.1, 149.6, 251/231, 236, 336; 137/614.04; 285/24, 27, 914

(56) References Cited

U.S. PATENT DOCUMENTS

| | | |
|---|---|---|
| 655,672 A | 8/1900 | Engel |
| 665,252 A | 1/1901 | Morawetz |
| 729,145 A | 5/1903 | Eckenwiler |
| 850,070 A | 4/1907 | Spikes |
| 928,813 A | 7/1909 | Spikes |
| 1,304,390 A | 5/1919 | Semenow et al. |
| 1,371,882 A | 3/1921 | Ferguson et al. |
| 2,006,833 A | 7/1935 | Jensen |
| 2,187,389 A | 1/1940 | Winkler |
| 2,470,256 A | 5/1949 | McIlroy |
| 2,790,571 A | 4/1957 | Flaith et al. |
| 3,005,475 A | 10/1961 | Beall |
| 3,035,603 A | 5/1962 | Jamieson et al. |
| 3,065,885 A | 11/1962 | Chatten |
| 3,170,667 A | 2/1965 | Szohatzky |

(List continued on next page.)

FOREIGN PATENT DOCUMENTS

| | | |
|---|---|---|
| CA | 670440 | 9/1963 |
| GB | 771968 | 4/1957 |

*Primary Examiner*—Henry C. Yuen
*Assistant Examiner*—Eric Keasel
(74) *Attorney, Agent, or Firm*—Leo F. Costello

(57) ABSTRACT

A fluid coupling system is provided including a fluid coupling having a cooperative key coding system and latching mechanism, a valve biasing mechanism with corrosion resistance, and other advantageous features. The key coding system permits interconnection of only matched coupling members while preventing the inadvertent interconnection of mismatched coupling members notwithstanding the presence of many coupling, both matched and mismatched. The coupling includes first and second coupling members that are releasably slideably, axially interfitted with their passageways in fluid communication. The key coding system includes key coding elements on the coupling members that are axially movable into matched interengagement when the coupling members are matched but are precluded from moving into matched interengagement when they are mismatched, all without rotation of the couplings or the key coding elements irrespective of the relative rotational positions of the couplings members or coding elements. The latching mechanism is movable axially and radially of the coupling members between latching and unlatching positions, again without relative rotation of the latching mechanism arid coupling members. The key coding system allows the latching mechanism to move into latching position when the key coding elements match but precludes such movement when there is a mismatch. Although the key coding system and the latching mechanism do not require rotation to function, they allow relative rotation of the coupling members. Furthermore, the coupling incorporates a valve biasing mechanism that does not use a metallic spring or other corrodible parts in contact with the corrosive chemicals.

21 Claims, 8 Drawing Sheets

U.S. PATENT DOCUMENTS

| | | |
|---|---|---|
| 3,301,578 A | 1/1967 | Platt et al. |
| 3,351,359 A | 11/1967 | Ferraris |
| 3,361,152 A | 1/1968 | Akers |
| 3,670,929 A | 6/1972 | Berry |
| 3,861,569 A | 1/1975 | Johnston |
| 4,080,737 A | 3/1978 | Fleer |
| 4,089,444 A | 5/1978 | Shea |
| 4,134,522 A | 1/1979 | Patzke et al. |
| 4,150,673 A | 4/1979 | Watt |
| 4,211,439 A | 7/1980 | Moldestad |
| 4,411,287 A | 10/1983 | Hyde |
| 4,436,125 A | 3/1984 | Blenkush |
| 4,529,105 A | 7/1985 | Lewins |
| 4,619,640 A | 10/1986 | Potolsky |
| 4,665,960 A | 5/1987 | Brzezicki et al. |
| 4,696,326 A * | 9/1987 | Sturgis ............... 251/149.6 X |
| 4,699,298 A | 10/1987 | Grant et al. |
| 4,790,567 A | 12/1988 | Kawano et al. |
| 4,804,208 A | 2/1989 | Dye |
| 4,907,019 A | 3/1990 | Stephens |
| 5,052,725 A | 10/1991 | Meyer et al. |
| 5,108,015 A | 4/1992 | Rauworth et al. |
| 5,971,019 A | 10/1999 | Imai |
| 6,089,541 A * | 7/2000 | Weinheimer et al. .... 251/149.6 |

* cited by examiner

FLUID COUPLING SYSTEM

RELATED APPLICATION

This application is a non-provisional application based on our provisional application filed Jul. 9, 1999, Application No. 60/143,127.

FIELD OF THE INVENTION

The present invention pertains to a fluid coupling system and more particularly to a fluid coupling having a cooperative key coding system and latching mechanism, a valve biasing mechanism with corrosion resistance, and other advantageous features.

BACKGROUND

Certain manufacturing processes require the use of many corrosive and highly reactive chemicals. In the semiconductor industry, for example, some fifteen to twenty liquid chemicals are typically stored in adjacent fifty-gallon supply drums from which they are dispensed during the manufacturing process. In the usual installation, sets of separate umbilical delivery lines for various chemicals are suspended above the drums with a particular set dedicated to a particular chemical. Each set of delivery lines is connected to its associated supply drum by a fluid coupling that has one coupling member on the delivery lines and a second coupling member on the drum.

As each supply drum is emptied during the manufacturing process, a full drum is brought in to replace the empty one. Accordingly, the coupling members must be repeatedly connected and disconnected. Because of the incompatibility of the chemicals, it is critical that each set of delivery lines be connected only to its intended drum to avoid unsafe mixing and undesired contamination. Moreover, to maintain productivity, such connections and disconnections must be made quickly and routinely by production personnel.

To insure correct connection of delivery lines to their intended supply drums, chemical extraction apparatus of the type described above uses fluid couplings that incorporate matching coding elements on the coupling members. Examples of such fluid couplings and their coding devices are shown and described in the U.S. Pat. No. 4,699,298 to Grant et al. and U.S. Pat. No. 5,108,015 to Rauworth et al. A significant disadvantage of these known couplings, however, is that they cannot be as quickly connected and disconnected as is desired. Although referred to as quick-connect couplings, they use threaded parts to secure the connection. Repeated threading and unthreading of couplings over a production run consumes a significant amount of valuable time and also can produce additional delays if the threads become fouled and otherwise fail to mesh properly.

Fluid couplings that can be connected and disconnected without threading are of course available and are truly quick-connect and -disconnect couplings. Examples of known quick-connect couplings are disclosed in U.S. Pat. No. 4,436,125 to Blenkush and U.S. Pat. No. 5,052,725 to Meyer et al. Such known couplings of this type, however, are not suitable for the chemical extraction industry or other industries where matched connections are mandatory since they make no provision for coding, that is, insurance against making mismatches. Moreover, the latching mechanisms used in such known quick-connect couplings do not lend themselves to balanced and dependable two-handed operation by personnel in production processes such as described above.

In addition, the parts of such fluid couplings that contact the harsh chemicals being carried must be resistant to such chemicals. Materials such as high density polyethylene (HDPE), ethylene polymers (EPDM), or "Teflon" PFA are commonly used and provide excellent chemical resistance. A coil spring is the common device used to close an internal poppet valve of the type under discussion. It has been recognized that if the coil spring is made of metal, it will corrode in the presence of the chemicals. Two solutions have been used, namely, to coat the metal spring with plastic or to use any entirely plastic coil spring, but neither is satisfactory. The coated springs, coated with "Teflon" PFA for example, may still be vulnerable to attack if the chemical is able to penetrate the plastic. Furthermore, entirely plastic springs, again made of "Teflon" PFA for example, are unable to maintain the valve closed, causing leakage.

The U.S. Pat. No. 6,007,107 to Kazarian, and the co-pending application of Clancy et al., application No. 09/085,382, filed May 26, 1998 (hereinafter "Clancy et al. application"), both having a common assignee with the present application, provide solutions to the problems set forth above. The present application provides alternative solutions. Each of these prior copending applications is incorporated in its entirety in the present application.

SUMMARY

A fluid coupling system is provided including a fluid coupling having a cooperative key coding system and latching mechanism, a valve biasing mechanism with corrosion resistance, and other advantageous features. The key coding system permits interconnection of only matched coupling members while preventing the inadvertent interconnection of mismatched coupling members notwithstanding the presence of many coupling, both matched and mismatched. The coupling includes first and second coupling members that are releasably slideably, axially interfitted with their passageways in fluid communication. The key coding system includes key coding elements on the coupling members that are axially movable into matched interengagement when the coupling members are matched but are precluded from moving into matched interengagement when they are mismatched, all without rotation of the couplings or the key coding elements irrespective of the relative rotational positions of the couplings members or coding elements. The latching mechanism is movable axially and radially of the coupling members between latching and unlatching positions, again without relative rotation of the latching mechanism and coupling members. The key coding system allows the latching mechanism to move into latching position when the key coding elements match but precludes such movement when there is a mismatch. Although the key coding system and the latching mechanism do not require rotation to function, they allow relative rotation of the coupling members. Furthermore, the coupling incorporates a valve biasing mechanism that does not use a metallic spring or other corrodible parts in contact with the corrosive chemicals.

An object of this invention is to provide improvements in a fluid coupling system.

Another object is to provide a coded quick-connect and disconnect coupling for use in a chemical extraction system involving supply drums of chemicals and separate delivery lines suspended above the drums.

A further object is to improve the dependability, productivity, and safety of dispensing a plurality of incompatible chemicals through different delivery lines from different supply drums in a manufacturing process.

A still further object is to simplify the construction, reduce the manufacturing costs, and improve the overall dependability of fluid coupling systems used in chemical extraction applications.

An additional object is to provide a simplified and dependable key coding system for a fluid coupling.

Another object is to provide a simplified and dependable latching mechanism for fluid coupling that uses a key coding system.

A further object is to avoid the corrosive effects of harsh chemicals on a fluid coupling used to handle the chemicals.

Yet another object is to provide a more dependable closure mechanism for the poppet valve in a fluid coupling wherein the closure mechanism is not made of materials that corrode in the presence of harsh chemicals while providing a dependable seal that does not leak.

Another object is to provide an interactive key coding system and latching mechanism in a fluid coupling wherein the coupling members cannot be coupled and latched unless they match.

Still another object is to provide a fluid coupling for fluid carrying lines that does not require threading or unthreading or rotation of the parts, and thus twisting of the lines, to couple, uncouple, latch or unlatch the coupling members but which allows relative rotation of the coupling members.

An additional object is to provide a coupling that includes coupling members, a key coding system, and a latching mechanism that can operate with only axial and radial motions of the parts.

Another object is to minimize the time required dependably to connect and disconnect matched coupling members of a coded coupling or to determine that the coupling members are mismatched and will not couple.

An additional object is to provide a key coding system for a coupling that can handle many different combinations of matches and mismatches.

A further object is to provide a resiliently yieldable biasing mechanism for the poppet valve in a fluid coupling that can be exposed to harsh chemicals without corroding.

Still another object is to provide a resiliently yieldable biasing mechanism for a poppet valve that does not use metal or other corrodible materials in its construction.

These and other objects, features and advantages of the present invention will become apparent upon reference to the following description, accompanying drawings, and appended claims.

DETAILED DESCRIPTION

Figures 1, 2:
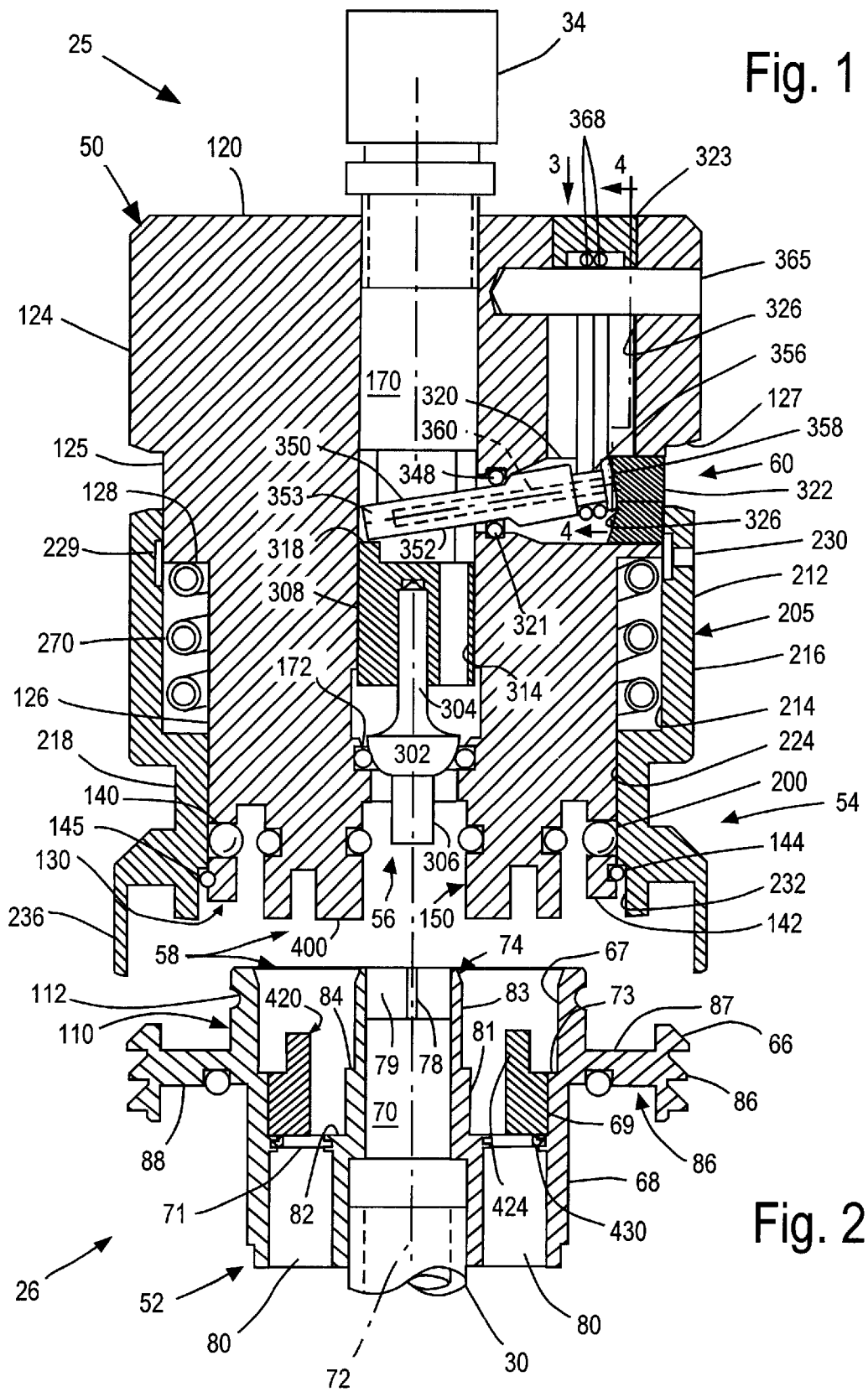
FIG. 1 is a longitudinal vertical section of an extractor head, or one coupling member of the coupling of a fluid coupling system, shown connected to a fitting for one delivery line; a latching sleeve of a latching mechanism on the coupling member; and one embodiment of a yieldable, valve biasing mechanism shown in its valve closing position forcing the poppet valve of the extractor head into closed position, all in accordance with the principles of the present invention.
FIG. 2 is a longitudinal vertical section of an extractor drum insert, or the other coupling member of the coupling of the subject fluid coupling system, and a key insert ring in the drum insert, both in accordance with the principles of the present invention.

A preferred embodiment of the fluid coupling system of the present invention is generally indicated by the numeral 25 in FIGS. 1 and 2 and includes a fluid coupling generally indicated by the numeral 26. The coupling is both a "quick-connect" and a "quick-disconnect" coupling. As is well known, such expressions as "quick-connect," "quick-disconnect," and "quick-release" couplings are commonly used to mean a coupling that has both quick-connecting and quick-disconnecting capabilities. Accordingly, the expression "quick connect" coupling is used herein to mean a coupling that is both quick to connect and quick to disconnect.

The fluid coupling system 25 (FIGS. 1 and 2) is particularly suited for use in conducting chemicals in the semiconductor industry where a variety of highly corrosive and incompatible chemicals are used. Such chemicals include ammonium hydroxide; hydrogen peroxide; and hydrofluoric, phosphoric, nitric, hydrochloride and sulfuric acids. These chemicals are typically stored in a fifty-five gallon drum, as more fully illustrated in FIGS. 1 and 1a of U.S. Pat. No. 5,108,015. The process employed in the semiconductor industry for supplying these chemicals may involve from fifteen to twenty of the drums with each drum containing a particular chemical.

The chemical extraction system or apparatus generally indicated in FIG. 1 herein includes a chemical supply or down tube or line 30 immersed in the chemical of one of the drums described above but not shown and extending up to the bunghole of the drum. The extraction system also includes a chemical delivery line or hose, not shown, attached to a delivery line fitting 34, and an air or nitrogen feed line or hose, not shown, attached to an air fitting 36, each of which is connected to the coded quick-connect coupling 26. The chemical delivery hose extends from the drum to the work area of the semiconductor plant where the chemical in that drum is to be used. The air hose extends to a source of air or nitrogen under pressure, not shown.

As is well known, the chemical and air delivery hoses, not shown, are suspended in an umbilical fashion above the drums, not shown, and are connected to their respective drums by a fluid coupling which in the present case is the coupling 26 in the fluid coupling system 25. The subject coupling allows for the quick and dependable disconnection and reconnection of these umbilical hoses to the down tube 30 when a depleted drum is removed and a full drum replaces it, while ensuring that the chemical hoses for a particular chemical is connected to the corresponding drum containing that chemical.

The fluid coupling system 25 (FIGS. 1 and 2) of the present invention in general provides the coupling 26 that includes an extractor head 50 connected to the chemical and air delivery hoses, not shown, via the fittings 34 and 36, respectively; an extractor drum insert 52 connected to the drum, not shown, and its down tube 30; a latch or latching mechanism generally indicated at 54 for latching the extractor head and the extractor drum insert together when they are matched and interfitted; a poppet valve 56 that opens and closes upon connection and disconnection, respectively, of the extractor head and the extractor drum insert; a key coding system 58 that ensures connection of an extractor head and delivery hose for a certain chemical to a matched extractor drum insert and supply drum containing that chemical; and a yieldable, poppet valve biasing mechanism 60.

As with the coupling of the copending Clancy et al. application, the subject coupling is made almost exclusively of a corrosion-resistant, durable, and hard fluoropolymer plastic, such as "Teflon" PFA, that is perfluoroalkoxy, sold by the Dupont Corporation among others, or polyethylene. The only parts of this coupling that are not of this plastic material are isolated from the corrosive chemicals, as explained below. Of particular significance to the present invention is the fact that the biasing mechanism 60 does not use a metallic spring or metallic parts exposed to the harsh chemicals. Most of the parts of the coupling may be either molded or machined, although one of the major advantages of the subject coupling is that it may be readily molded rather than machined since the latter is more expensive.

Prior to describing the details of the valve biasing mechanism 60 and the key coding system 58, brief reference will be made to other parts of the extractor head 50 and extractor drum insert 52, having in mind that these parts are very similar but not identical to corresponding parts in the Clancy et al. application, cited above. As such, where convenient, the same reference numbers as used in the Clancy et al. application have been used herein to describe similar parts. Thus, the extractor drum insert (FIG. 2) includes an outer, cylindrical, adapter fitting 66 having external threads 68 and a tubular male coupling member 74 concentrically fixed in the fitting by a radial wall 71 that interconnects the fitting and the coupling member. The fitting has an upper internal cylindrical wall 67 and a lower internal cylindrical wall 69. The coupling member extends above and below the radial wall and provides a concentric main central fluid passageway 70 having a longitudinal central axis 72. The coupling member also has a lower outside cylindrical surface 81, a lower radial seat 82, an upper outside cylindrical surface 83, and an upper seat 84. The fitting also has an internal annular seat 73 above the radial wall that joins the upper and lower walls 67 and 69. The seats function as part of the key coding system 58 in a manner to be described. A spider 78 is incorporated at the upper end of the coupling member and is provided with a plurality of holes 79 to allow chemical or other fluid to flow upwardly from the down tube 30 through the main passageway of the male coupling member.

The radial wall 71 (FIG. 2) has a plurality of longitudinal air passages or openings 80 extending therethrough and providing for the passage of air downwardly through the adapter fitting into the drum, not shown. The chemical from the drum, not shown, can thus be drawn upwardly from the drum through the main passageway 70 of the male coupling member 74 while air is forced downwardly through the air passages or openings in the radial wall and into the drum. The extractor drum insert 52 also has an annular, outer radial flange 85 projecting radially outwardly from the adapter fitting 66 and terminating in outer threads 86. This flange also has a flat upper surface 87 and a lower surface 88, the latter providing an annular sealing groove 89 immediately adjacent to the adapter fitting.

The latching mechanism 54 (FIGS. 1 and 2) includes an inner latching ring 110 projecting upwardly from and integral with the radial flange 85 in radially outwardly spaced concentric relation to the male coupling member 74 and in radially inwardly spaced concentric relation to the outer threads 86 of the flange. This latching ring has an annular, radially outwardly opening, latching groove 112 that is approximately V-shaped in cross section thereby providing outwardly, upwardly and downwardly extending, divergent or beveled groove surfaces.

The extractor head 50 (FIGS. 1 and 2) includes an upper radial end wall 120, an upper outer cylindrical surface 124, an intermediate outer cylindrical surface 125, and a lower outer cylindrical surface 126, these surfaces being of gradually reduced diameter from the upper to the lower surfaces, thereby forming axially spaced outer, upper and lower shoulders 127 and 128. The extractor head also has a lower outer latching ring 130 that is a lower annular extension of the lower cylindrical surface but functionally forms part of the latching mechanism 54. This outer latching ring provides a plurality of latching holes or bores 140, six in this disclosed embodiment, that extend radially through the outer latching ring. These latching holes are equally angularly spaced about the outer latching ring so that with the six holes in this disclosed embodiment, the holes are spaced approximately sixty degrees apart. As with the latching mechanism in the Clancy et. al. application, these holes have inside chambers that taper inwardly so that the inside diameter of each hole is slightly less than its outside diameter. The outer latching ring terminates in a lower radial end face 142, and an annular radially outwardly opening retainer groove 144 is located in the outside face of the latching ring between the latching holes and the lower end face. A retainer ring 145 of rigid material is received in the retainer groove and projects slightly outwardly therefrom.

The extractor head 50 (FIGS. 1 and 2) also has a lower female coupling member 150 providing a central, downwardly opening axial socket defining a central longitudinal axis 153 of the extractor head. The female coupling member is concentric with and radially, inwardly spaced from the outer latching ring 130 so as to define a downwardly opening latching annulus 154 therebetween. The female coupling member also has an inner, annular sealing groove facing into the socket and an outer annular sealing groove facing into the latching annulus. An inner O-ring 162 is positioned in the inner groove, and outer O-ring 164 is located in the outer groove. The extractor head also has a main or central fluid passageway 170 having an upper end in which the chemical delivery fitting 34 is connected and a lower end extending coaxially downwardly in fluid communication with a valve seat 172 and opening downwardly into the female coupling member 150. It will be understood that the male and female coupling members constitute the fluid coupling 26 having a main central fluid passageway 70/170 when they are coupled.

Figure 3:
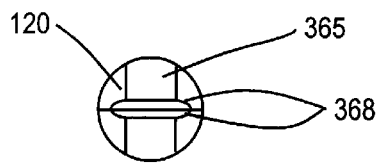
FIG. 3 is a plan view looking in the direction of arrow 3 in FIG. 1 but with the plug removed

In contrast to the coupling of the Clancy et. al. application, the air delivery fitting 36 (FIG. 9) extends radially outwardly and then upwardly from a radial bore in the extractor head 150 but still communicates with one or more longitudinally extending air passages 186 having lower ends that open downwardly from the head through the female coupling member 150. Furthermore, and with reference to FIG. 3, an air indicator fitting 192 extends radially outwardly from an air indicator bore 194 that extends radially inwardly of the head on the opposite side of the main passageway from the air delivery fitting 36. An air passage 196 extends from the indicator bore longitudinally downwardly and communicates with a radial air duct 198 that opens through the intermediate surface 125 of the head above the lower shoulder 128, all for a purpose to be described.

Figure 9:
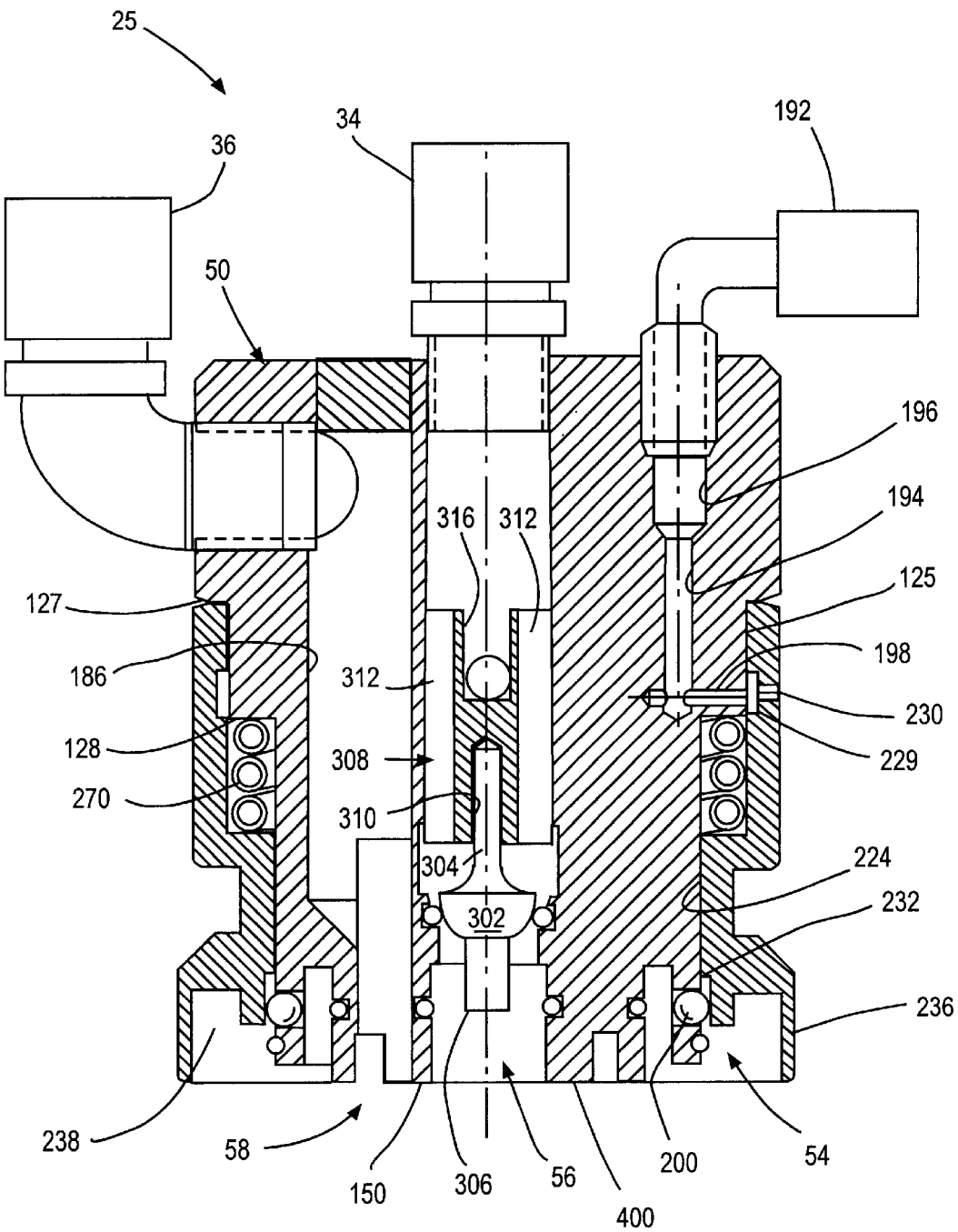
FIG. 9 is a longitudinal vertical section of the extractor head of FIGS. 1 and 5 taken on a plane ninety degrees displaced from the plane of FIGS. 1 and 5, showing the poppet valve closed like in FIG. 1, but showing the latching mechanism including the latching sleeve and latching balls fully retracted and ready to receive the extractor drum insert of FIG. 2.

The latching mechanism 54 of the subject fluid coupling system 25 (FIGS. 1, 2 and 5) includes a plurality of spherical, uniformly sized, latching balls 200 each having a diameter greater than the minimum, but less than the maximum, diameter of the latching holes 140. The balls are individually located in the latching holes for movement radially of the extractor head 50. The balls move between latching positions wherein portions of their spherical surfaces project into the latching annulus 154 (FIGS. 1 and 5) and retracted positions wherein the balls are entirely withdrawn into the latching holes so that none of the peripheries of the balls projects into the latching annulus (FIG. 9). Because the latching holes are tapered as described above, radial inward movement of the balls into the latching annulus is limited. That is, only spherical segments of the balls are allowed to project into the annulus, whereas the balls are free to move outwardly in the latching holes so as to drop out of the extractor head, except that they are retained therein in a manner described below.

The latching mechanism 54 also includes a latching sleeve 205 (FIGS. 1 and 2) that is axially and rotatably, slideably mounted on the extractor head 50. The sleeve includes an upper cylindrical section 212 slideably fitted around the intermediate surface 125 of the head and radially outwardly spaced from the lower surface 126 of the head.

The sleeve also has a lower cylindrical section 218 providing an inside, lower, cylindrical bearing surface 224 that slideably engages the lower surface 126 of the extractor head 50 in their assembled condition. A lower radial shoulder 220 between the upper and lower sections of the sleeve is in downwardly spaced, opposed relation to the upper radial shoulder 128. These two shoulders together with the lower section 126 of the head and the upper section 212 of the sleeve define an annular pocket 214 around the head. The upper section of the sleeve also is preferably externally knurled at 216 to facilitate manual handling. The sleeve is thus axially slideable on the head into and out of unlatched and latched positions as will be more fully described below. The sleeve and the head are also rotatable relative to each other throughout three-hundred and sixty degrees, although as will be seen, such rotation is not necessary to latch the coupling nor to test for a match between the extractor head 50 and the drum insert 52.

Figure 5:
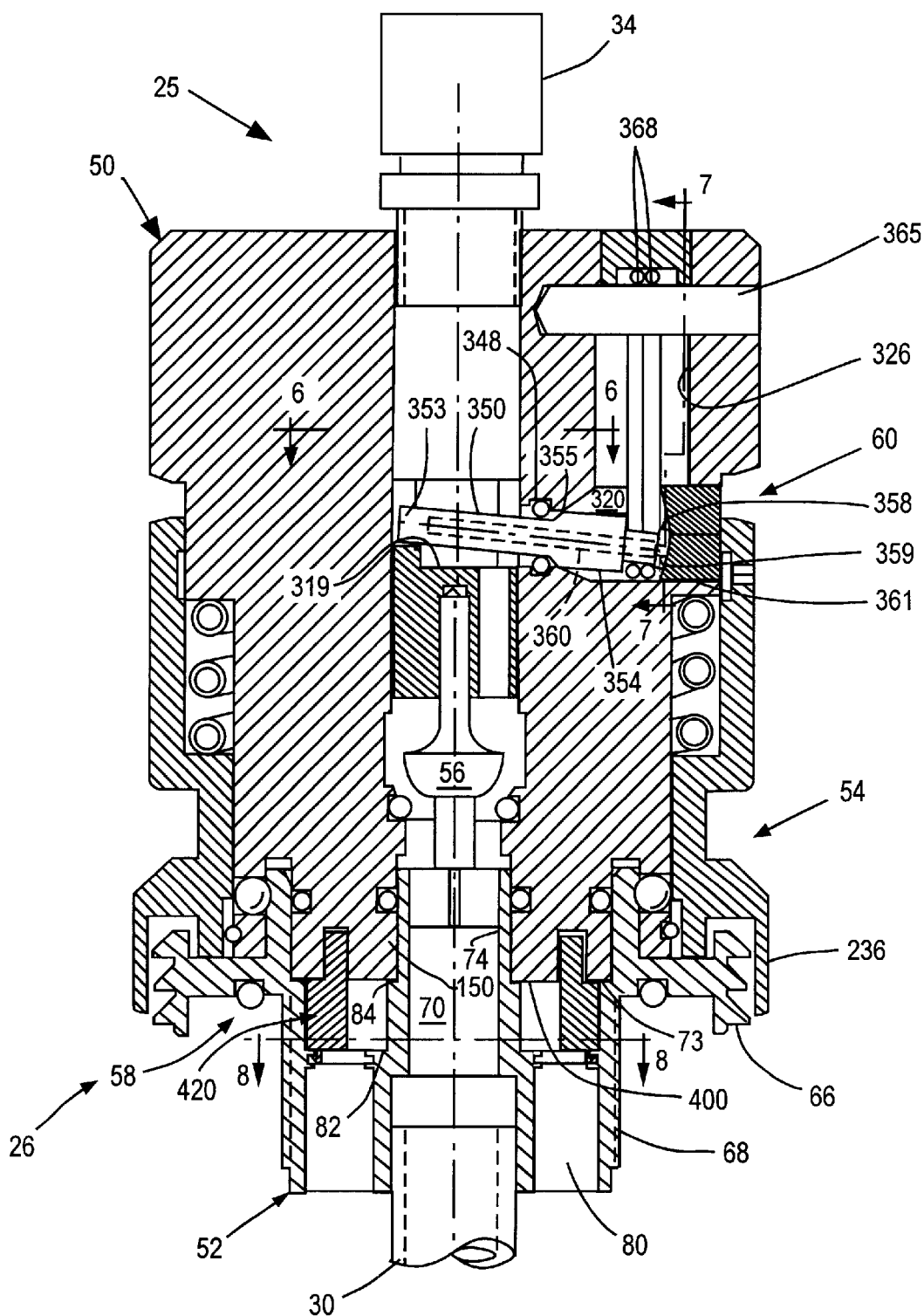
FIG. 5 is a longitudinal vertical section of the extractor head and drum insert of FIGS. 1 and 2 shown in their interfitted, coupled, and latched condition.

The upper section 212 of the latching sleeve 205 (FIG. 9) has an annular venting recess 229 circumscribing the extractor head 50 and an air port 230 extending radially outwardly from the recess and opening outwardly from the sleeve. When the latching sleeve is in its latching position, as shown in FIGS. 1 and 5, the venting recess does not register with the radial air duct 198 in the head (non-registry is not shown but may be visualized from FIG. 9), but when the latching sleeve is in its unlatched position, as shown in FIG. 9, the venting recess does register with the air duct. Air pressure applied through the fitting 192 will thus be felt by an operator whose hand is at the air port when the latching sleeve is in unlatched position, or conversely, no air will be felt at the air port when the latching sleeve is in latched position. Because the venting recess is annular, the presence or absence of air pressure at the port occurs irrespective of the relative rotational positions of the head and sleeve.

Still further, the latching sleeve 205 has an inside cylindrical recessed surface 232 (FIGS. 1, 5, 9) of slightly greater diameter than the bearing surface 224 and extending endwardly, i.e., downwardly, therefrom. The bearing and recessed surfaces are joined by a radial annular shoulder 220. The sleeve also has a lower outer skirt 236 that projects endwardly, i.e., downwardly, from the lower end of the sleeve in radially outwardly spaced relation to the recessed surface 232 and defining an annular space 238 with the portion of the sleeve that provides the recessed surface. A coiled compression latching spring 270 is received in the pocket 214 in circumscribing relation to the lower outer cylindrical surface 126, bears against the upper and lower shoulders 127 and 128, and yieldably urges the radial shoulder 220 against the retainer ring 145 and into its latching position. This spring may be of metal since it is isolated from the chemicals carried by the coupling 26, but it may also be of plastic or of plastic-coated metal.

Figure 6:
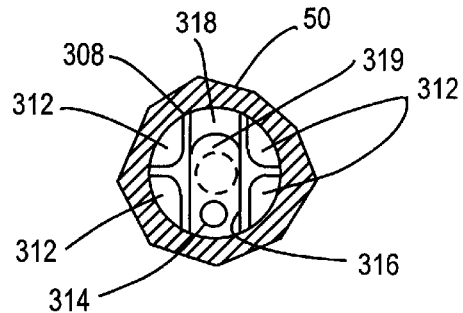
FIG. 6 is a fragmentary section taken on line 6—6 in FIG. 5 with the lever removed to show parts beneath.

The poppet valve 56 (FIGS. 1, 5, 6, 9) includes a generally hemispherical valve body 302 and upper and lower valve stems 304 and 306 extending respectively upwardly and downwardly from the valve body coaxially of the main passageway 170. A piston or plunger 308 is slideably received in the main passageway above the poppet valve and has a lower central bore 310 extending upwardly about half-way into the piston from the lower end thereof and receiving the upper valve stem. The piston is elongated and cylindrical and has four elongated, outwardly opening, longitudinally extending corner fluid passageways 312 at its quadrants (FIGS. 6 and 9) 13 and a single, elongated, internal, longitudinally extending offset fluid passageway 314 (FIGS. 5 and 6), all of these passageways extending entirely through the piston from the end-to-end thereof. The piston also has a transverse notch 316 above the central bore that extends entirely through the piston diametrically from side-to-side thereof and opens from the upper end of the piston. The piston provides a bearing ledge 318 (FIG. 5) in the notch at the side of the piston opposite from the side where the offset passageway is located and slightly elevated from the base 319 of the notch.

In order to accommodate the valve biasing mechanism 60 of the present invention, the extractor head 50 has a transverse bore 320 (FIGS. 1, 5, 9) extending radially outwardly from the main passageway 170 in alignment with the notch 316 in the piston 308. This transverse bore 320 opens outwardly of the head through the intermediate surface 125 just under the upper shoulder 127 and is closed by a side plug 322 that is preferably permanently attached, as by cementing, to the extractor head. The plug has an inner arcuate face 324 and an outer face that is shaped and positioned so as to form a smooth part of the cylindrical intermediate surface 125. The extractor head also has an upper longitudinal bore 326 extending lengthwise of the head in offset, parallel relation to the main passageway 170. This longitudinal bore 326 has a lower end communicating with the transverse bore 320 adjacent to the inner face of the plug and a upper end that opens outwardly through the upper end wall 120 of the head. A top plug 328 closes the upper end of this longitudinal bore and is also preferably permanently secured, as by cementing, to the head. This upper plug also has an outer surface that is smoothly coplanar with the upper end of the head. These plugs are of course not cemented in place until after the biasing mechanism 60 is installed in the bores 320 and 326, as will be described.

The transverse bore 320 (FIGS. 1, 5, 9) provides an annular groove 321 adjacent to its inner end just outside of the main passageway 170, and an O-ring sealing fulcrum 348 is fitted in this groove so that it is thereby immediately adjacent to the main passageway. An elongated lever 350 extends through the fulcrum and is positioned within both the transverse bore 320 and the main passageway. The lever has a cylindrical inner end portion 352 fitted in the notch 342 of the piston 308. The inner end portion is of a diameter slightly less than the width of the notch, allowing it freedom to move up and down in the notch, and has an end 353 engaging the ledge 318 in closely adjacent spaced relation to the wall of the main passageway 170. The lever also has a cylindrical outer end portion 354 in the transverse bore 320. The outer end portion has a diameter greater than the diameter of the inner end portion but less than the diameter of the bore, allowing it freedom to move up and down in the bore. The transition between the inner and outer portions provides an annular shoulder 355. The outer end portion has a cylindrical neck 356 of reduced diameter in alignment with the longitudinal bore and an end face 359 in slideable engagement the side plug 322. To strengthen the lever, which is made of non-corrosive material such as plastic, e.g., Teflon, a metallic pin 360, e.g., a steel pin, is embedded lengthwise in the lever and is sealed therein by a plastic plug 361 at the end face of the lever, the pin and plug being shown in dashed lines in FIGS. 1 and 5.

The sealing fulcrum 348 (FIGS. 1, 5, 9) is in circumscribing sealing engagement with the inner end portion 352 precluding passage of fluid chemical from the main passageway 170 into the transverse bore 320. As above noted, the diameter of the outer end portion 354 is slightly greater than the diameter of the inner end portion so that engagement of the outer end portion with the fulcrum limits inward movement of the lever 350. Engagement of the end face 359 with the side plug 322 of course limits outward movement of the lever. The transition between the inner and outer portions provides an annular shoulder 355 in sealing engagement with the fulcrum, thereby enhancing the seal between the main passageway and the transverse bore, especially against the outward fluid pressure from within the fluid passageway 170.

The width of the notch 316 (FIGS. 1, 5, 9) and its longitudinal dimension as well as the diameter of the main passageway 170 allows vertical movement of the inner end portion 352 in the main passageway within the notch. The vertical dimension of the transverse bore 320 is greater than the diameter of the outer end portion 354 and allows vertical movement of the outer end portion in the transverse bore. It will be understood that the lever is thus mounted for vertical pivoting movement, like a teeter-totter or seesaw, on the fulcrum 348 in the main passageway and in the transverse bore. During such pivoting movement, the inner end portion moves up and down in the notch 316 with the end bearing against the piston 308, and the outer end portion moves up and down in the transverse bore 320 with the end face 359 sliding against the side plug 322.

Figure 4:
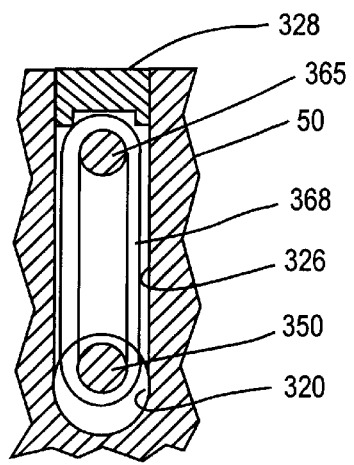
FIG. 4 is a fragmentary vertical section taken on line 4—4 in FIG. 1 showing the biasing band in retracted position.

With continued reference to FIGS. 1, 5, and 9, the valve biasing mechanism 60 also provides a bar 365 extending transversely through the longitudinal bore 326 at its upper end and in upwardly spaced relation to the transverse bore 320. An endless, resiliently expandable, elastic biasing band or bands 368 are extended around the bar, extends lengthwise of the longitudinal bore, and extend around the neck 356 of the lever 350. Although one band may suffice, two bands are preferred since one is a back-up for the other. For simplicity, however, the bands may be collectively referred to in the singular. The circumference of the band is such that the band and thus the valve biasing mechanism have a normal valve closing position or condition wherein the band is retracted, i.e., relatively relaxed and under reduced or minimal tension (FIGS. 1 and 4), causing it to pull the neck 356 and thus the outer end portion 354 of the lever upwardly in the transverse bore 350, thereby biasing the inner end portion 352 downwardly. In this normal valve closing position, the band is not completely unstressed but, as stated, is relatively relaxed and still sufficiently stressed enough to bias the inner end portion of the lever downwardly against the bearing ledge 316 of the piston 308. This downward pressure of the inner end portion of the lever against the piston causes the piston to force the valve body 302 to seat in the valve seat 172 of the extractor head 50, as shown in FIG. 1, thereby closing the valve 56, provided however, that the coupling members 74 and 150 are not coupled, that is, the spider 78 is not pressing upwardly against the poppet valve 56 and forcing it open.

Figure 7:
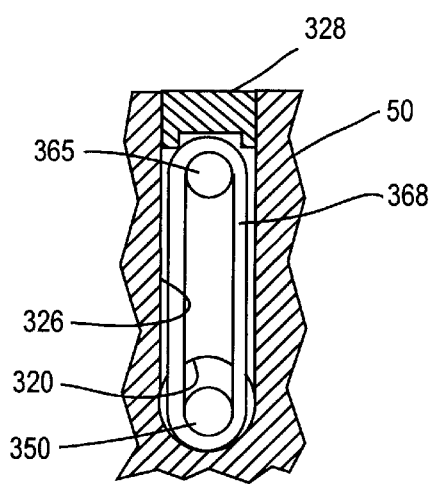
FIG. 7 is a fragmentary vertical section taken on line 7—7 in FIG. 5, similar to FIG. 4 but showing the biasing band in expanded position.
Figure 8:
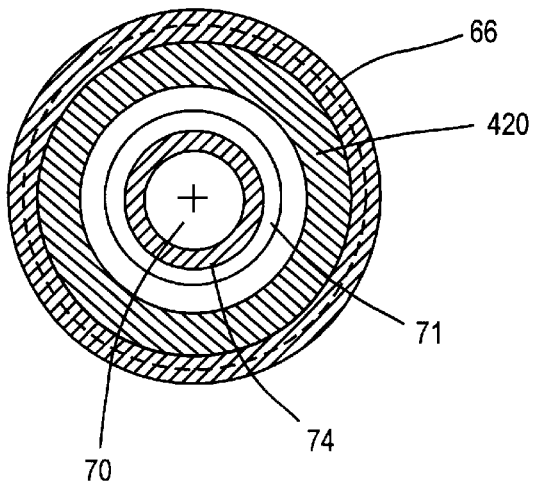
FIG. 8 is a transverse horizontal section taken on line 8—8 in FIG. 5.

In operation, the valve biasing mechanism 60 is normally in its valve closing position, as shown in FIGS. 1 and 9. When the extractor head 50 is coupled to the extractor drum insert 52, as shown in FIG. 5, the spider 78 presses upwardly against the lower valve stem 306 to open the poppet valve 56. This opening action is permitted by the valve biasing mechanism 60 since the bands 368 expand (FIGS. 5 and 7), allowing the piston 308 to tilt the lever 350 in a clockwise direction, as shown in FIGS. 1 and 5, and causing the neck 356 to pull the bands downwardly into a valve opening position or condition. With the poppet valve open, liquid chemical is of course allowed to flow from the drum, not shown, upwardly through the passageway 70/170 and out through the delivery fitting 34. The liquid chemical flows through the passages 312 and 314 and the notch 316 of the piston and thus over the inner end portion 352 of the lever 350, all of which are of materials resistant to the corrosive effects of the chemicals. The sealing fulcrum 348 blocks flow of chemical into the transverse bore 320, but even if chemical were to enter this bore, the parts therein are likewise resistant to the chemicals. When the coupling members 74 and 150 are uncoupled, thereby removing the upward pressure of the spider 78 on the valve body 302, the bands contract, pulling the neck upwardly, and pushing the inner end portion 352 downwardly, thereby pressing the piston 308 and thus the valve body into the valve seat 172.

It will thus be understood that the valve biasing mechanism 60 (FIGS. 1, 5, 9) replaces the typical coiled spring, such spring being coated or uncoated metal or entirely plastic, commonly used in the fluid couplings of the type here involved. As previously briefly noted, the extractor head 50 and drum insert 52, the poppet valve 56, the O-rings 162 and 164, the valve seat 172 and the fitting 34 and all parts of the valve biasing mechanism including the piston 308, the lever 350 (except for the embedded metallic pin 360), the plugs 322, 328, and 361, the bar 365, the bands 368, and all of the parts of the coupling 26 that come in contact with the chemicals, are all made of non-corrosive materials, such as plastic, synthetics and the like, as again described above. Thus, contact by the corrosive chemicals being carried in the fluid coupling does not deteriorate the subject fluid coupling system 25. Not only is the subject valve biasing mechanism corrosion-resistant, it positively and dependably maintains the poppet valve closed so that it does not leak when it is intended that the valve be closed.

Figure 10:
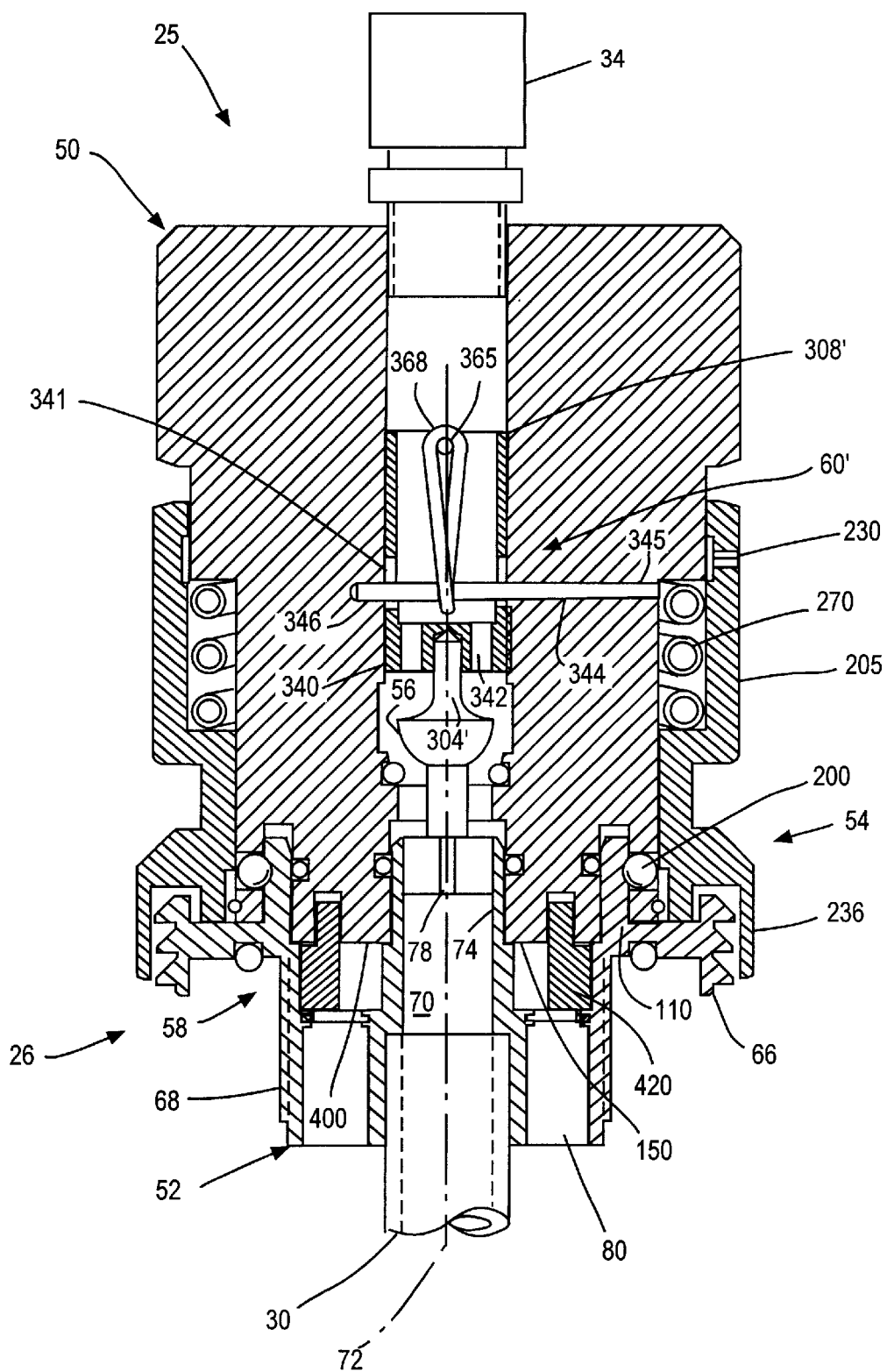
FIG. 10 is a longitudinal vertical section of an extractor head, or one of the coupling members of the coupling of the subject fluid coupling system, similar to FIG. 1, but showing another embodiment of a valve biasing mechanism of the present invention, the biasing mechanism being shown in its valve opening position wherein it pulls the poppet valve of the extractor head into open position.

A second embodiment of the valve biasing mechanism is generally indicated by the numeral 60' in FIG. 10. This valve biasing mechanism includes a tubular piston or plunger 308' slideably fitted in the main passageway 170 and having a lower end 340 with a bore that receives the upper stem 304' of the valve body 302 and four holes 342 at the quadrants providing fluid passage through the piston. The piston also has an upper end adjacent to the delivery line fitting 34. The piston has a hollow interior above the lower end and a pair of opposed, elongated, longitudinally extending lateral slots 341 opening out of the interior. An elongated anchor rod 344 extends transversely of the main passageway 170 through the slots 341 of the piston and has opposite ends 345 and 346 anchored within the extractor head 50. Although not shown, this anchor rod may also have an embedded reinforcing pin like the pin 360. A bar 365' extends transversely of and is mounted in the upper end of the piston in upwardly spaced relation to the rod. An endless, resiliently expandable, elastic band or bands 368', again collectively referred to in the singular for simplicity, extends around the bar and the rod and lengthwise in the piston.

The circumference of the band 368' (FIG. 10) is such that when it is relatively relaxed and in minimal tension. as when the coupling members 74 and 150 are separated, a position not shown, the band pulls the piston downwardly forcing the valve body 302 into the valve seat 172, thereby closing the valve. This is the retracted position of the band and thus the valve closing position of the biasing mechanism 60'. When the coupling members are connected, causing the spider 78 to push the valve body 302 open, the band 368' expands against the fixed anchor rod 352, allowing the piston 308' to be lifted by the rising valve body. This is the expanded position of the band and thus the valve opening position of the biasing mechanism 60'. When the coupling members are uncoupled, the band again constricts thereby pulling the piston and thus the valve body back down into closed position.

The second embodiment of the valve biasing mechanism 60' (FIG. 10) is also entirely made of corrosion resistant materials such as plastics, synthetics or rubber. Even with the principal parts of the valve biasing mechanism located in the main passageway 170, the mechanism is not deteriorated by the corrosive action of the chemicals being carried and thereby dependably and reliably performs its valve closing and opening functions. This second embodiment is provided if it is preferred that the valve biasing mechanism be located directly in the path of the flowing chemicals, as is traditional with the commonly used springs.

With reference now particularly to FIGS. 1, 5, 8 and 11–16, the key coding system 58 of the subject invention is described. The key coding system illustrated in the drawings and described below operates on the same general principal as disclosed in the above cited Kazarian Pat. No. 6,007,107 in that only axial movement of the coupling members 74 and 150 is required in order to achieve a match between the coupling members or to realize that there is a mismatch and that coupling cannot be made. Another similarity is that the subject coding system is located inside the coupling 26 and yet is not in the main fluid passageways 70/170. The differences between the subject key coding system and that of the Kazarian patent include, inter alia, the reduced number and increased size of the key coding elements and the compatibility of the subject key coding system with the latching mechanism 54 of the present application without incorporating the key coding elements on the latching sleeve 205. The advantages of these differences include dependability in operation and reduced manufacturing costs while retaining the advantage of axial only, i.e., non-rotatable, coupling.

The subject key coding system 58 (FIGS. 1, 5, 8 and 11–16) is provided in the coupling ends of the male and female coupling members 74 and 150 that face each other as they are about-to-be coupled and eventually mate when coupled. Thus, the female coupling member 150 has a radial end wall having an outside diameter 402 and an inside diameter 404 and a coding groove or coding element 410. The coding groove has inside and outside diameters 411 and 412, an axial length or depth 414, and a radial width 415. The inside and outside diameters 411 and 412 are intermediate to the inside and outside diameters 404 and 402 of the end wall. One of the ways that the code of the subject key coding system is changed is by varying the dimensions of the radial end wall and the groove and of their corresponding parts of the extractor drum insert 52. The subject key coding system of the present invention thus involves variations in the radial dimensions and radial locations of the key coding elements.

Thus, a key coded insert ring 420 (FIGS. 1, 5, 8 and 11–16) is positioned in the extractor drum insert 52 and has an annular base 422 resting on the radial wall 71 and against the inside cylindrical wall 69 of the adapter fitting 66. The ring includes an annular coding key or tongue or coding element 424 projecting upwardly from the base and having inside and outside diameters 425 and 426, an axial length 427, and a radial width 428, respectively matching the inside and outside diameters 411 and 412, the depth 414, and the width 415 of the coding groove 410 for matching key codes. Snap fasteners 430 project downwardly from the base through the air passages 80 and snap in a groove in the radial wall 71 of the adapter fitting 66.

When the male and female coupling members 74 and 150 are moved from an uncoupled position (FIGS. 1/2 and FIGS. 11/12) toward a coupled position (FIGS. 5 and 10), the coupling members will fully couple when the coding key 424 matches and fits within the coding groove 410. As stated, the inside and outside diameters 425 and 426 of the key 424 are dimensioned relative to the inside and outside diameters 411 and 412 of the coding groove so that the key fits in the coding groove 410 if there is a match. If the key does not have the location and the dimensions that correspond to the location and dimensions of the coding groove, the key and the groove will not interfit and a match does not exist, thereby preventing the coupling members from moving into their fully coupled positions.

The coding groove 410 and the coding key 424 shown in FIGS. 1, 2 11 and 12 represent one code and may be regarded as key code number 1 for the purpose of this explanation. The subject key coding system 58 provides for multiple codes since there must be a separate code for every chemical being carried in the fluid coupling 26, perhaps fifteen to twenty chemicals. Examples of two other codes, e.g., key codes numbers 2 and 3, are shown in FIGS. 13–16, wherein different key codes are obtained by shifting the radial positions of the coding groove 410 and the coding key 424. That is, the end wall 400 and the insert ring 420 have different matching locations and dimensions, or more generally configurations, of the groove and the key.

Figure 13:
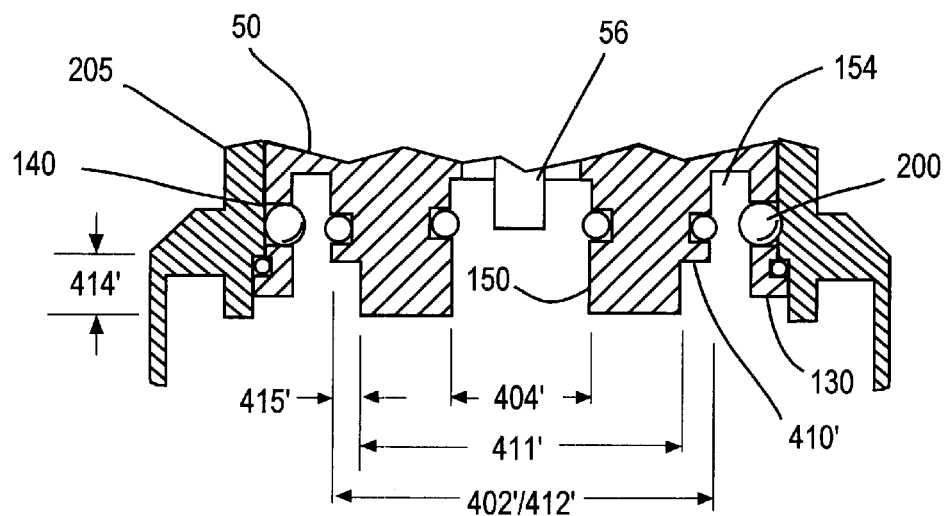
FIG. 13 is a fragmentary longitudinal vertical section of a portion of an extractor head similar to FIG. 11 but even more abbreviated and showing just enough structure to facilitate explanation of a key code different from FIG. 11.
Figure 14:
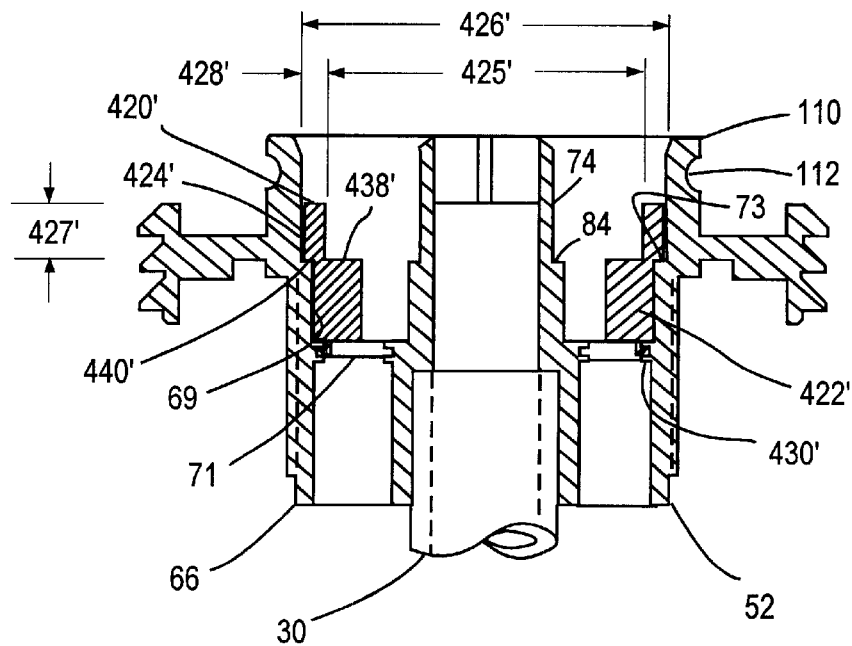
FIG. 14 is a longitudinal vertical section of the extractor drum insert similar to FIGS. 2 and 12 but showing a key code that matches the key code of the head of FIG. 13.
Figure 15:
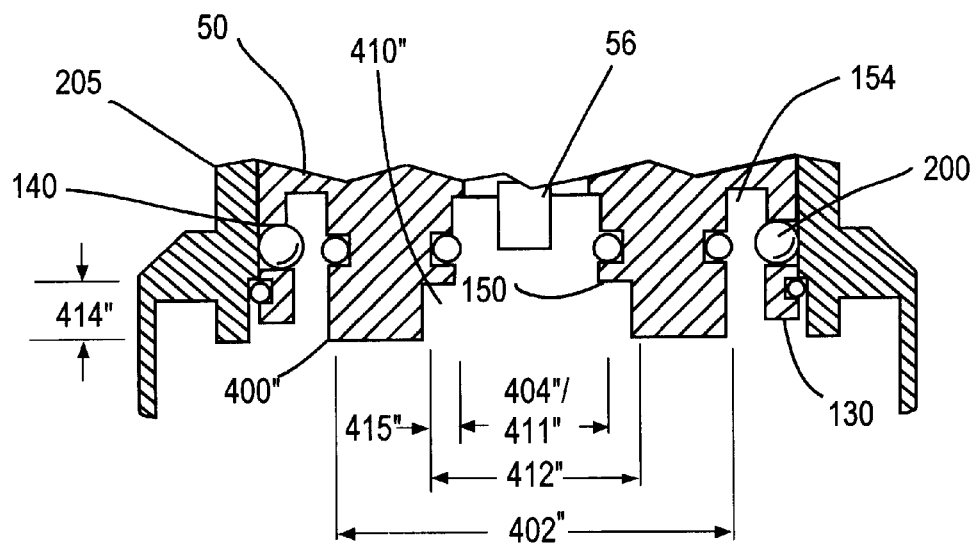
FIG. 15 is a view similar to FIG. 13 but showing a still different key code.
Figure 16:
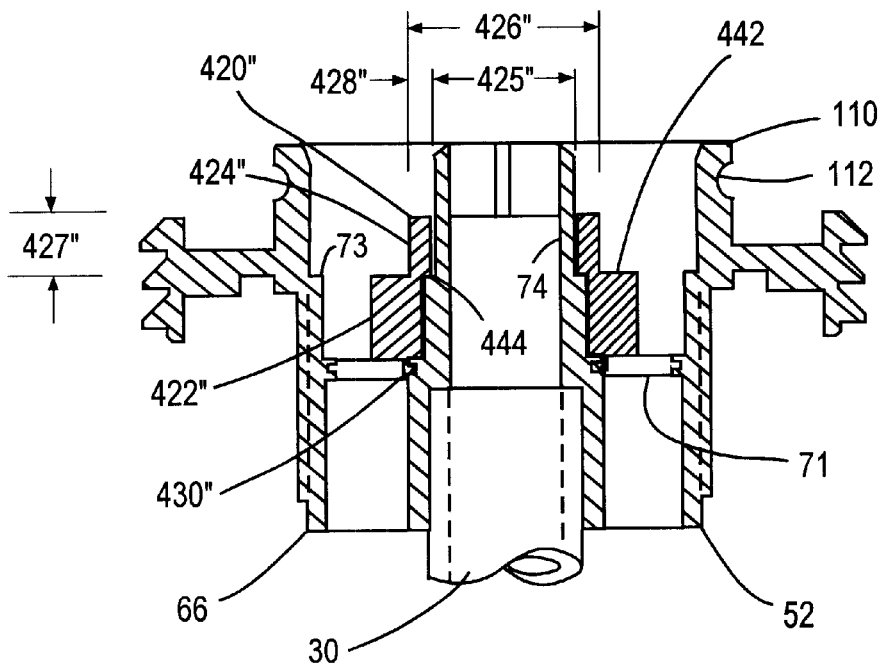
FIG. 16 is a view similar to FIG. 14 but showing a key code that matches the key code of the head shown in FIG. 15.

Three such configurations of the end wall 400 of the extractor head 50 and the key coded insert ring 420 are shown by way of example in FIGS. 11–16, although the subject invention provides for many more configurations. The code of FIGS. 1/2, 5 and 11/12 is the same, but reference is made at this point in the description only to FIGS. 11 and 12 for this code, referred to herein as code 1. Thus, the end wall 400 has an intermediate groove 410 (FIG. 11); the end wall 400' has an outside groove 410' (FIG. 13); and the end wall 400" has an inside groove 410" (FIG. 15). Correspondingly, the ring 420 has an outside ledge 436 (FIG. 12); the ring 420' has an inside ledge 438 and an outside shoulder 440 (FIG. 14); and ring 420" has an outside ledge 442 and an inside shoulder 444 (FIG. 16). Another way of characterizing the key coding system in the extractor drum is that there are a plurality of inside key code rings and a plurality of outside key code rings. In the present application, there are shown two outside rings and one inside ring, representing the three codes referred to above. As an example of how additional codes are provided, the subject system also employs a second inside ring, not shown, thereby making four rings, two inside and two outside. Correspondingly, the subject system employs a second intermediate groove, or fourth groove, not shown, in the end wall 400 to match the key in the fourth insert ring.

Figure 11:
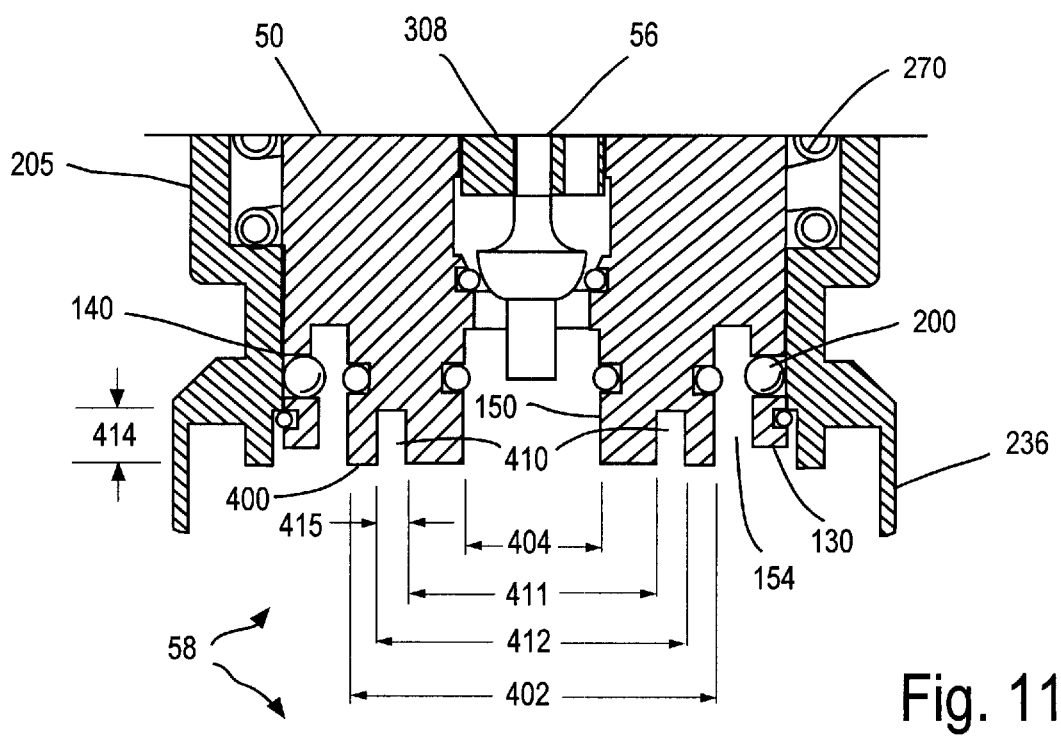
FIG. 11 is a fragmentary longitudinal vertical section of a portion of the extractor head of FIG. 1 but on a reduced scale and provided to facilitate a description of the key code used in the embodiments of FIGS. 1, 5 and 9.
Figure 12:
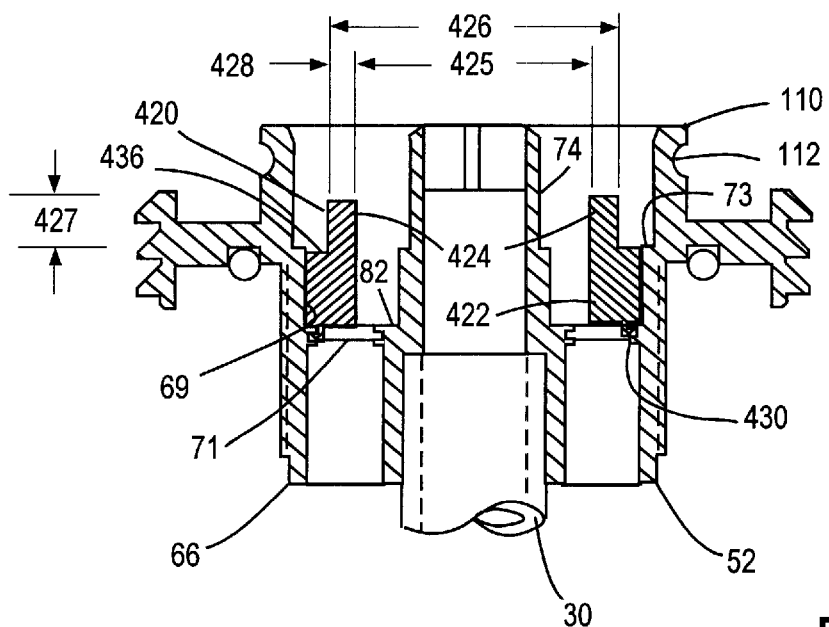
FIG. 12 is a longitudinal vertical section of the extractor drum insert similar to FIG. 2, but on a reduced scale and provided along with FIG. 11 to facilitate description of the key code used in the embodiments of FIGS. 1, 5 and 9 and thus that matches the key code of the head of FIG. 11.

More specifically, in FIGS. 11 and 12, showing key code number 1, the coding groove 410 is located centrally of the end wall 400, and the coding key 424 is similarly located centrally of the annulus between the fitting 66 and the male coupling member 74, with this outside ring against the lower wall 69 of the fitting 66 and with the ledge 436 coplanar with the seat 73 of the fitting. In FIGS. 13 and 14, showing key code number 2, the coding groove 410' is located at the outside diameter 402 of the radial end wall 400', and the annular key 424' is similarly located on the outside of this outside key insert ring 420'. The ring 420' is also against the lower wall 69 of the fitting with the shoulder 440 resting on the seat 73. The groove 410' and key 424' of this key code number 2 have greater diameters than the groove 410 and key 424 of key code number 1. Thus, when the male and female coupling members 74 and 150 including key code 2 are moved towards coupled positions, the coding key 424' and the coding groove 410' will interfit. If a female coupling member including key code 1 were to be attempted to interfit with a male coupling member including key code 2, however, the insert ring 420' would abut the end wall 400 and interfitting could not occur.

Similarly in FIGS. 15 and 16, for key code 3 in this example, the coding groove 410" is located on the inside diameter 404 of the radial end wall 400". The key insert ring 420" is an inside ring and the coding key 424" is located on the inside of the ring 420" with the ring against the male coupling member 74 and resting on the lower seat 82 and with the inside shoulder 444 resting on the upper seat 84. The coding groove and annular key of FIGS. 15 and 16 have the same locations and diameters and will interfit when the coupling members are moved together, but this groove and key will not match and interfit a key or groove of key codes 1 and 2.

From the foregoing it will be understood how multiple key codes can be provided in the subject key coding system 58 (FIGS. 11–16). By fixing the location and dimensions of the coding groove 410 and the coding key 424 radially of their respective coupling members 74 and 150, many different matched combinations may be obtained. In addition, by varying the axial length 427 and width 428 of the key and the corresponding depth 414 and width 415 of the coding groove, even more matched combinations can be obtained. Furthermore, as explained, if the key code of the female coupling member does not match the key code of the male coupling member, including the location and radial and longitudinal dimensions of the key code elements, the coupling members will not be able to be fully coupled.

As above noted, the subject key coding system 58 is compatible with the subject latching mechanism 54, in a manner now described. With particular reference to FIGS. 1 and 2, when the male and female coupling members 74 and 150 are separated, and not being manipulated by an operator, the latching sleeve 205 will be in its fully extended position wherein the radial shoulder 220 bears against the retaining ring 145, preventing the sleeve from falling off from the extractor head 50 and forcing the balls 200 into the latching annulus 154, preventing coupling. Prior to attempting to connect the coupling members 74 and 150, i.e., the extractor head 50 and the extractor drum insert 52, the operator manually retracts the latching sleeve by moving it axially upwardly along the extractor head, as can be visualized in FIG. 1 and as is shown in FIG. 9. In order to achieve coupling, the sleeve must be pulled upwardly against the action of the spring 270 far enough to place the recessed surface 232 opposite to the latching balls 200, as shown in FIG. 9, allowing them to be moved out of the latching annulus. In this position, air exits the port 230 and can be felt on the operator's hands grasping the extractor head 50

The operator then moves the extractor head 50 (FIGS. 9, 1, 2, 5) and thus the female coupling member 150 toward and over the male coupling member of the extractor drum insert 52. If the coding groove 410 and coding key 424 match as they do in FIGS. 1 and 2, for example, the key will slip into the coding groove thereby allowing the latching annular 154 to be moved over the latching ring 110 and bringing the latching balls 200 into alignment with the latching groove 112. The balls can then be moved into the latching groove 112 by releasing the sleeve and allowing the spring to force the latching sleeve downwardly on the extractor head. Downward movement of the sleeve causes the bearing surface 224 to force the balls into the latching groove, precluding their movement outwardly of the latching groove, and retaining them therein. As such, the coupling members are latched together in coupled condition whereby the poppet valve 56 is opened by the spider 78 against the action of the biasing mechanism 60 or 60' as above explained.

If, for example, coupling of a mismatched extractor head 50 and drum insert 52 (e.g., FIGS. 12 and 13) is attempted, following the sequence described in the preceding paragraph, the coding groove 410' will not fit on or over the key 424, the latching groove 112 in the latching ring 110 cannot be brought into alignment with the latching balls 200, and the latching sleeve cannot be extended. That is, in attempting to make any mismatched coupling, the latching annulus can be brought down far enough to place the balls 200 opposite to the upper end of the latching ring, above the latching groove 112, but no farther because of the interference of the mismatched key code elements. As such, the latching sleeve cannot move downwardly far enough the place the bearing surface 224 opposite to the balls since the shoulder 220 will engage the balls that are at this time precluded from retracting into their holes 140 by the presence of the upper end of the latching ring. Thus, the mismatched key and groove 424 and 410' will prevent the coupling of the members 74 and 150 and will prevent the latching sleeve 205 from moving downwardly into a latching position. Accordingly, the operator will still feel air exiting from the port 230, signaling that a mismatch is involved and that the wrong delivery lines are being attempted to be coupled to that drum.

To review this air signal in the subject fluid coupling system 25 (FIG. 9), when the latching sleeve 205 is retracted, the venting recess 229 is brought into registration with the air duct 198, causing air to flow through the air port 230 onto the operator's hands. This flow of air continues as long as the coupling members 74 and 150 are not fully interfitted and latched. However, when latching does occur, the sleeve 205 is allowed to move fully downwardly into its latching position thereby moving the venting recess out of registration with the air duct, cutting off the flow of air through the port, positively signaling to the operator that a match and latched condition has been achieved.

In the foregoing description, it will be understood that coupling of the extractor head 50 and the drum insert 52 is achieved without twisting or swiveling of the extractor head or of the hoses, not shown, connected to the delivery line and air line fittings 34 and 36. Nevertheless, swiveling is accommodated if the natural position of the hoses forces twisting, such as an untwisting action of the hoses. The latching sleeve 205 is allowed to rotate on the extractor head but such rotation is not necessary either to couple the coupling members 74 and 150 or to latch the same in their coupled positions. The subject fluid coupling system 25 allows for ease of operator action because the operator merely grasps the knurled actuating surface 216 with both hands thereby to squeeze the latching sleeve up against the upper shoulder 127 of the extractor head. This action is taken prior to attempting to couple the coupling members, but also when it is desired to uncouple the coupling members. In the later case, the upward squeezing of the latching sleeve causes the recessed surface 232 to be opposite to the balls 200 whereupon they can move outwardly from the groove 112 and whereupon the valve body 302 is forced into a sealing relation with the valve seat 172 under the action of the biasing mechanism 60 or 60'. Moreover, this coupling and uncoupling and latching and unlatching are achieved without any threaded or unthreading of the parts. The coupling, with the possible exception of the isolated spring 270 can be entirely and effectively molded out of chemically-resistant plastic as described, thus not only improving the dependability of the system but also minimizing manufacturing costs.

Although preferred embodiments of the present invention have been shown and described, various modifications, substitutions and equivalents may be used therein without departing from the spirit and scope of the invention. Accordingly, it is to be understood that the present invention has been described by way of illustration and not limitation.

What is claimed is:

1. A fluid coupling, comprising:

a male coupling member;

a female coupling member, said coupling members being capable of moving into interfitted and coupled relationship, said coupling members also having outer surfaces facing outwardly of the coupling;

a latching mechanism including latching members on the coupling members moveable into and out of latched engagement and an actuating member axially slideably mounted on the outer surface of one of the coupling members and moveable between a latching position forcing the latching members into latched engagement and an unlatched position allowing the latching members to move out of latched engagement, the actuating member having an outside surface facing outwardly of the coupling; and key coding elements on the coupling members allowing the coupling members to move into interfitted and coupled relationship and the latching members to move into latched engagement when the coding elements are matched but precluding movement into said latched engagement and said coupled relationship when the coding elements are mismatched, the key coding elements on both of the coupling members being spaced radially inwardly of said outside surface of the actuating member.

2. The coupling of claim 1, wherein the key coding elements on both coupling members are disposed radially inwardly of the latching members on their respective coupling members.

3. The coupling of claim 1, wherein the key coding elements include an annular groove with inside and outside walls and an annular key with inside and outside walls respectively of substantially the same diameters as the inside and outside walls of the groove so that the key can fit in the groove.

4. The coupling of claim 1, wherein the latch members on one of the coupling members includes a plurality of radially extending holes circumferentially spaced about the coupling member;

wherein the latch members also include a plurality of balls radially moveably mounted within the holes;

wherein the actuating member is a sleeve axially, slideably moveable on said one coupling member between a latching position forcing the balls radially inwardly of the holes and an unlatched position allowing the ball to move radially outwardly of the holes;

wherein there is a latch member on the other coupling member comprising a circumferential groove alignable with the holes and the balls when the coupling members are in interfitted and coupled relationship; and wherein the sleeve has a skirt extending axially of said one coupling member in overlapping relation to and externally of the other coupling member in the latching position of the sleeve.

5. The coupling of claim 1, wherein a skirt on the actuating member extends axially of the coupling in outwardly, laterally covering and protecting relation to the key coding element on said one coupling member when the coupling members are in uncoupled relationship; and wherein the skirt extends axially of the coupling in outwardly, laterally covering and protecting relation to the key coding elements on both coupling members when the coupling members are coupled relationship.

6. The coupling of claim 1, wherein the coupling members have ends facing each other;

wherein the end of one of the coupling members has an end wall facing the other coupling member;

wherein one of the key coding elements is an annular groove in the end wall of said one coupling member; and wherein another of the key coding elements is a key insert ring connected to the end of the other coupling member and projecting axially of said other coupling member toward said one coupling member.

7. The coupling of claim 6, wherein the ring includes a base fitted within said other coupling member, an annular key projecting toward said one coupling member, a radial shoulder, and a radial ledge.

8. The coupling of claim 6, wherein the ring includes a base fitted within said other coupling member, an annular key projecting toward said one coupling member, and a radial ledge.

9. The coupling of claim 8, wherein the ledge projects outwardly from the key.

10. The coupling of claim 8, wherein the ledge projects inwardly of the key.

11. The coupling of claim 6, wherein the ring includes a base fitted within said other coupling member, an annular key projecting toward said one coupling member, and a radial shoulder.

12. The coupling of claim 11, wherein the shoulder projects outwardly of the key and terminates radially inwardly of the outside surface of the actuating member.

13. The coupling of claim 11, wherein the shoulder projects inwardly of the key.

14. The coupling of claim 11, wherein the shoulder projects radially from the key on one side thereof; and wherein there is a ledge projecting radially from the key on the side thereof opposite from the shoulder.

15. A coded fluid coupling, comprising:

a first coupling member having a coupling end and a fluid passageway opening through the coupling end;

a second coupling member having a coupling end and a fluid passageway opening through the coupling end of the second coupling member, the passageways defining axes of their respective couplings, the coupling members having a fully coupled condition wherein the coupling ends of the members are in contact and the passageways are in fluid communication; and a key coding system including matched pairs of intermitting annular grooves and annular keys, each groove-and-key-pair constituting a separate code whereby the system provides a plurality of codes, there being one of said annular grooves in one of the coupling ends and circumscribing its passageway, there being one of said annular keys in the other of the coupling ends and circumscribing its passageway, the grooves and the keys of the codes each having several parameters including inside and outside diameters, axial depth and radial width, each groove-and-key-pair being a matching groove and key with corresponding parameters, thereby allowing the key to fit in the groove and the coupling members to move into fully coupled condition upon axial movements of the ends of the couplings toward each other into said coupled condition, the parameters of each groove-and-key-pair differing from the parameters of the other groove-and-key-pairs in the system whereby a mismatched groove and key prevent the coupling members from moving into fully coupled condition upon axial movements of the ends of the couplings toward each other, one groove-and-key-pair of the key coding system including a groove being defined between a pair of radially spaced walls on one of the coupling members, one of said groove walls facing radially outwardly of the coupling and the other groove wall facing radially inwardly of the coupling, said one groove-and-key-pair including a key being defined by a pair of axially extending key walls on the other coupling member, one of said key walls facing radially outwardly of the coupling and being engageable with the radially inwardly facing groove wall and the other key wall facing radially inwardly of the coupling and being engageable with the radially outwardly facing groove wall, said engageability of the groove and key walls occurring in the coupled condition of the coupled members.

16. The coupling of claim 15, wherein the key is an insert ring fastened to its coupling member.

17. The coupling of claim 15, including a latching ring on one of the coupling members and a latching annulus on the other coupling member receiving the ring when the coupling members are in said coupled condition; and wherein the groove and the key are circumscribed by the latching ring and annulus in said coupled condition.

18. The coupling of claim 15, wherein each matched groove-and-key-pair includes a concentric key and groove of substantially the same diameters and whose groove and key walls have substantially the same radial spacing.

19. The coupling of claim 15, wherein each matched groove-and-key-pair includes a concentric key and groove of substantially the same diameters and whose groove has an axial depth a least as deep as the axial length of the key.

20. A fluid coupling, comprising:

a male coupling member;

a female coupling member, said coupling members being capable of moving into interfitted and coupled relationship;

a latching mechanism including latching members on the coupling members moveable into and out of latched engagement and an actuating member axially slideably mounted on one of the coupling members and moveable between a latching position forcing the latching members into latched engagement and an unlatched position allowing the latching members to move out of latched;

key coding elements on the coupling members allowing the coupling members to move into interfitted and coupled relationship and the latching members to move into latched engagement when the coding elements are matched but precluding movement into said latched engagement and said latching position when the coding elements are mismatched; and a skirt on the actuating member extending axially of the coupling outwardly of the key coding element on said one coupling member and in generally protecting and covering relation to the key coding element on said one coupling member when the coupling members are in uncoupled relationship and outwardly of the key coding elements on both coupling members when the coupling members are coupled relationship.

21. A fluid coupling having an exterior surface, comprising:

a male coupling member;

a female coupling member, said coupling members being capable of moving into interfitted and coupled relationship;

a latching mechanism including latching members on the coupling members moveable into and out of latched engagement and an actuating member axially slideably mounted on one of the coupling members and moveable between a latching position forcing the latching members into latched engagement and an unlatched position allowing the latching members to move out of latched, one of the coupling members having an end wall, the other coupling member having a transverse wall facing the end wall of said one coupling member, the end wall of said one coupling member having an annular key coding groove opening endwardly thereof, said groove being defined by at least one outwardly facing, axially extending annular wall, said at least one axially extending annular wall having an outside diameter; and an annular coding key projecting axially from the transverse wall of said other coupling member toward the groove, the key being defined by a pair of axially extending inside and outside annular walls, the inside wall having an inside diameter, said inside and outside diameters being substantially equal, and the key and the groove being located radially inwardly of the exterior surface of the coupling.

* * * * *